United States Patent [19]

Andersson et al.

[11] Patent Number: 4,594,843
[45] Date of Patent: Jun. 17, 1986

[54] LAWN MOWER KNIFE ASSEMBLY

[75] Inventors: Roger Andersson, Gränna; Lennart Engdahl; Jan Klasson, both of Tranås, all of Sweden

[73] Assignee: Stiga AB, Tranas, Sweden

[21] Appl. No.: 647,516

[22] Filed: Sep. 5, 1984

[30] Foreign Application Priority Data

Sep. 9, 1983 [SE] Sweden .............................. 8304839

[51] Int. Cl.$^4$ ........................................... A01D 55/18
[52] U.S. Cl. ...................................... 56/295; 56/17.5
[58] Field of Search .................. 56/295, 17.5, 13.6, 56/12.7; 30/263, 205

[56] References Cited

U.S. PATENT DOCUMENTS

| | | | |
|---|---|---|---|
| 2,627,156 | 2/1953 | Carter | 56/295 |
| 3,252,304 | 5/1966 | Moody | 56/295 |
| 3,690,051 | 9/1972 | Wood | 56/295 |
| 3,910,017 | 10/1975 | Thorud et al. | 56/295 |
| 4,229,933 | 10/1980 | Bernard | 56/295 |
| 4,513,563 | 4/1985 | Roser et al. | 56/12.7 |

Primary Examiner—John J. Wilson
Assistant Examiner—John G. Weiss
Attorney, Agent, or Firm—Beveridge, DeGrandi & Weilacher

[57] ABSTRACT

The invention relates to a lawn mower knife assembly including a rigid bar, plate or disc attached to a motor-driven generally vertical shaft and provided, at a distance from the shaft attachment, with at least two attachment points for knife means, and at least two knife means, each including a blade section provided with a cutting edge and a shank section adapted for the fixation of the knife means to the bar, plate or sheet.

The new feature is that each of the attachment points comprises a flat surface section in which there is made a through-hole for a screw or the like and a recess arranged beyond the hole, and that the shank section of each knife means includes a flat surface section with a through-hole and a projection provided adjacent said surface section and extending away from the plane of the surface section, while the surface sections of the attachment points and the shank section are adapted, when in mounted condition, to lie in contact with each other with the holes aligned, and the projection is adapted for accommodation in the recess in order to constitute a rotary latch which is yieldable to pre-determined strain.

4 Claims, 3 Drawing Figures

LAWN MOWER KNIFE ASSEMBLY

The present invention relates to a lawn mower knife assembly including a rigid bar, plate or disc attached to a motor-driven generally vertical shaft and provided, at a distance from the shaft attachment, with at least two attachment points for knife means, and at least two knife means each including a blade section provided with a cutting edge, and a shank section adapted for the fixation of the knife means to the bar, plate or sheet.

In the market there are today available two principal embodiments of lawn mower knives. In one embodiment the knife means proper are connected via a pivot with a central disc or the like attached to the motor shaft. In the other embodiment the knives constitute rigid extensions on a rod, bar or the like equally rigidly secured to the motor shaft. The present invention relates to the latter type of lawn motor knives. Rigid lawn mower knives are often exposed to severe damages when hitting extraneous hard objects in the grass, which may result in a heavy shock stress on the end of the rigid knife whereby the shaft may bend.

An object of this invention is to provide a device which eliminates the risk of the knife or motor shaft being damaged when hitting hard objects, while retaining the advantages of the rigid lawn mower knife.

The new feature of the device according to the invention is that each of the attachment points comprises a flat surface section in which there is made a through-hole for a screw or the like and a recess arranged beyond the hole, and that the shank section of each knife means includes a flat surface section with a through-hole and a projection provided adjacent said surface section and extending away from the plane of the surface section, while the surface sections of the attachment points and the shank section are adapted, when in mounted condition, to lie in contact with each other with the holes aligned, and the projection is adapted for accommodation in the recess in order to constitute a rotary latch which is yieldable to pre-determined strain.

An embodiment of a lawn mower according to the invention will be described more fully below with reference to the accompanying drawing in which.

Figure 1:
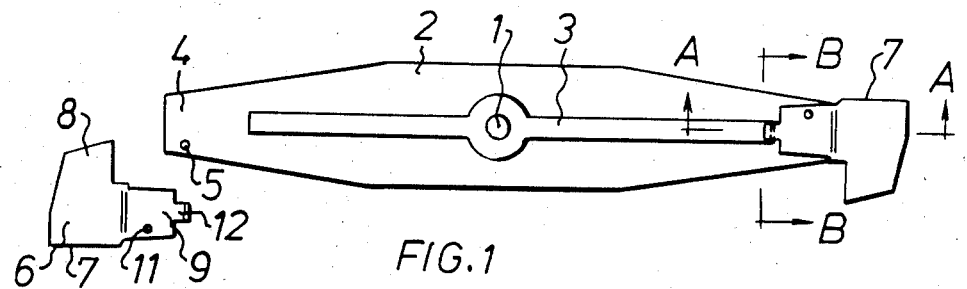
FIG. 1 is bottom view of the knife with one of the knife means being removed.
Figure 2:
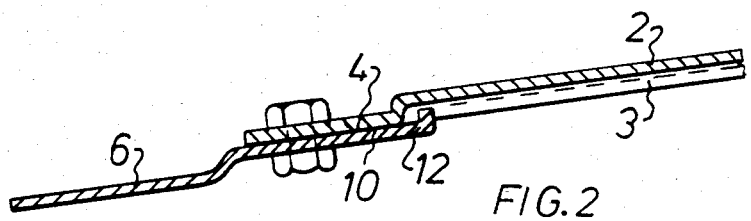
FIG. 2 is a partial cross-section of the knife according to FIG. 1 on line A—A.
Figure 3:
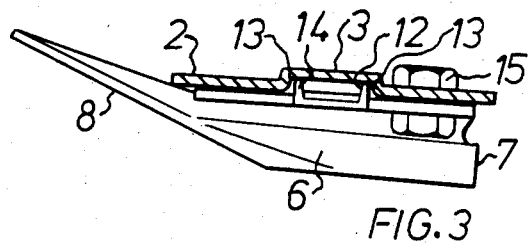
FIG. 3 is a cross-section of the same knife on line B—B in FIG. 1.

A bar 2 is appropriately attached to the motor shaft designated by 1. The bar, which is made of pressed plate or the like, is provided with a longitudinally extending recess 3 which is adapted to stiffen up the bar and which has at its ends flat abutment portions 4. Each such portion has a through-hole 5 which, in the embodiment shown, is situated on the side of the longitudinal axis of the bar.

Either knife means consists of the knife portion proper 6 which along one border is shaped as a cutting edge 7 and at the opposite border has an upwardly bent, bevelled wing 8, and a shank portion 9 having a flat contact surface 10 with a through-hole 11 and a projection 12. The end of the projection is cross-bent and has an extension which, as counted from the flat surface, corresponds to the depth of the longitudinal recess 3 of the bar, as counted from the flat end portion 4 of the bar.

The longitudinal recess 3 is for the major part of its length shaped as a trough with rounded edges. At the ends, where the projections of the knife means are to be received, the sides of the recess are upright so as to form sharp corners 13. Also the cross-bent projection has sharp corners 14 which, in cooperation with the corners of the recess, will make that the knife means in mounted condition will be firmly secured to the bar. The width at the ends of the recess are accurately adjusted to the cross-bent extent of the projections so that the play will be the smallest possible. This eliminates the risk of the knives getting loose due to normal vibrations. The knife means, which are fixed to the bar 2 by means of bolts 15, have their surfaces 10 lying in contact with the bar end portion surfaces 4. The knives are maintained in the intended position due to the engagement between the cross-bent extensions of the projections 12 and the ends of the recess 3.

If a knife hits a hard object, for instance a stone, a torsional moment will act upon the knife means which will tend to turn about the screw 15 against the locking action of the extension engaging the recess in coaction with the friction between the interengaging surfaces 4 and 10. If the twisting moment exceeds a pre-determined value the corner of the cross-bent end 14 of the projection will deform, on one hand, because the corner is knocked up and, on the other hand, because the cross-bent extension will as a whole be pressed out of the recess 3. Essential to this is that the side faces of the extension lie in contact with a surface which is approximately parallel therewith because this will prevent the projection from snapping out of the recess even as a result of relatively moderate strains. The approximately parallel edges of, on one hand, the cross-bent extension of the projection and, on the other hand, one side of the recess result in elimination of the risk of unintentional snap-out and permit the knife means to be turned out of position only when the strain exceeds a pre-determined value. The strain force involves that it is as a rule the corner of the projection that is deformed while the edge on the recess will be left substantially intact. This has the advantage that it is necessary to exchange only that knife which would all the same have to be discarded for the reason that its edge portion usually is already damaged.

Bar as well as knife means are preferably made of steel plate but of course also other materials are conceivable. Thus, the bar may be made of e.g. composite material, light metal or the like on condition that the edge laterally defining the recess is provided with a lining of hard material.

The invention is of course also applicable to knives of other types, for instance those consisting of a circular disc or sheet. The only condition therefor is that it should be possible to arrange along the periphery contact sections corresponding to those designated by 4 and to make, at either contact portion, a recess having at least one transversely disposed side. The invention must not be considered restricted to that described above and shown in the drawing but may be modified in various ways within the scope of the appended claims.

What we claim and desire to secure by Letters Patent is:

1. A lawn mower knife assembly including a rigid member (2) attached to a generally vertical motor-driven shaft (1), said rigid member being provided, at a distance from the shaft attachment, with at least two attachment points for knife means, and at least two knife means (6), each including a blade section provided with a cutting edge (7), and a shank portion (9) adapted for the fixation of the knife means to the rigid member wherein each of the attachment points comprises a flat surface section (4) in which there is made a through-hole (5) for a fastener and a recess (3) arranged beyond the hole, the shank portion (9) of each knife means including a flat surface section (10) with a through-hole (11) and a projection (12) provided adjacent said flat surface section (10) of the shank portion, said projection extending away from the plane of the flat surface section of the shank portion, while the surface sections (4, 10) of the attachment point and the shank portion are adapted, when in mounted condition, to lie in contact with each other with the holes (5, 11) aligned, and the projection (12) is accommodated in the recess to deter rotation of the knife about said fastener; said projection and recess constituting a yieldable rotary latch means wherein, when the knife is subjected to a predetermined twisting moment, the entire projection snaps out of the recess and rotates with the knife about said fastener.

2. Assembly as claimed in claim 1, wherein the rigid member is made of sheet material said recess being disposed inside the end section and being formed by deforming the sheet material, said knife means being made of sheet material, metal, has a projection (12) protruding from the said projection having a cross-bent tongue which is received in said recess.

3. Assembly as claimed in claim 2, wherein the recess which receives the projection is laterally defined by wall sections situated generally at right angles to the flat surface section of the rigid member, said cross-bent tongue having sharp corners and a width which corresponds to the distance between said wall sections.

4. Assembly as claimed in claim 1, 2 or 3, wherein said rigid member has a longitudinally extending pressed trough serving as a stiffening means, said trough having end portions which constitute the recesses for the projections of the knife means, said through-holes for the fasteners being situated beyond and on either side of a central line drawn along the rigid member.

* * * * *